Sept. 22, 1970    B. PORTNOV    3,529,813
MATERIAL HEAT-TREATING APPARATUS WITH CONVEYOR
Filed July 5, 1968    3 Sheets-Sheet 3

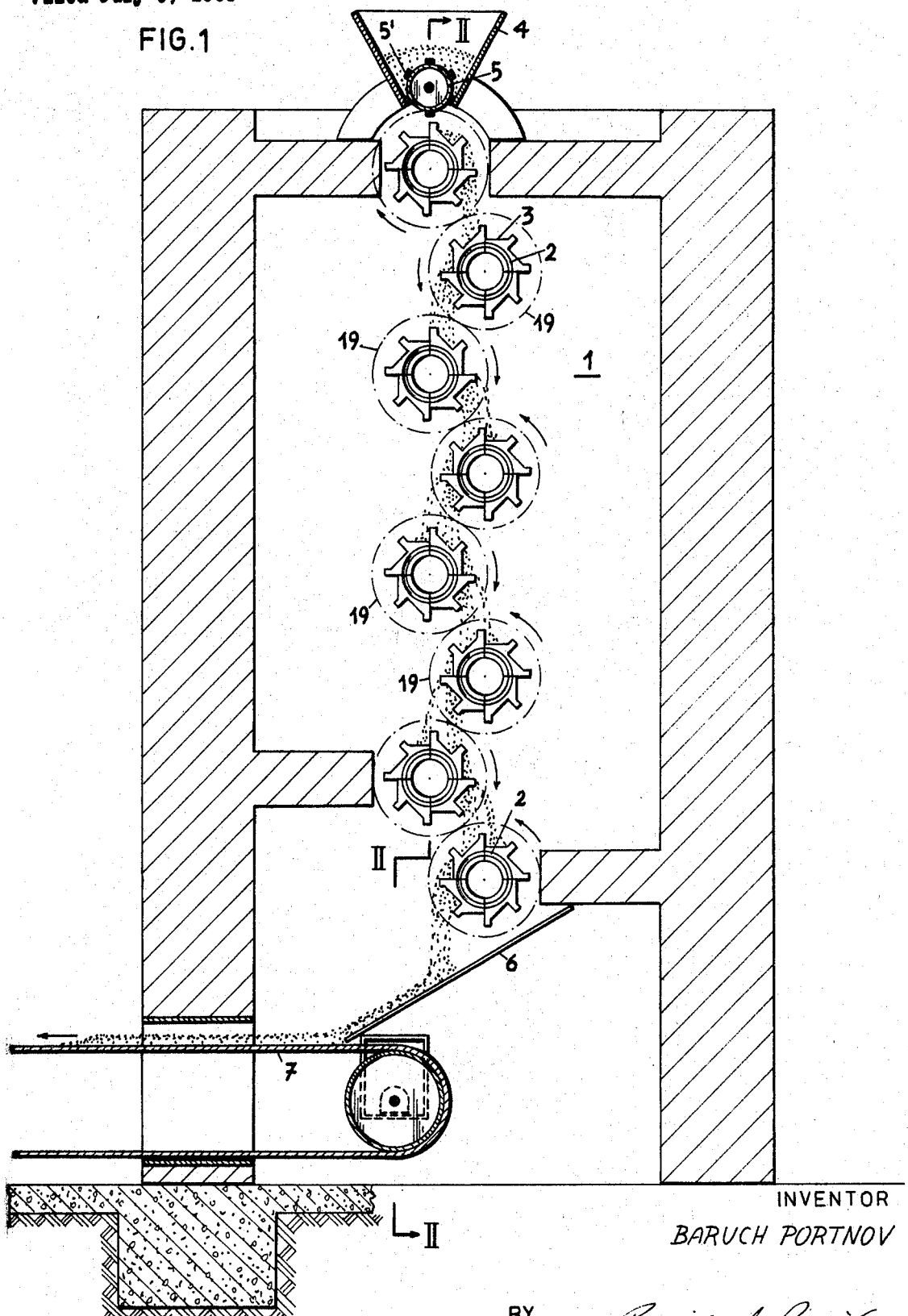

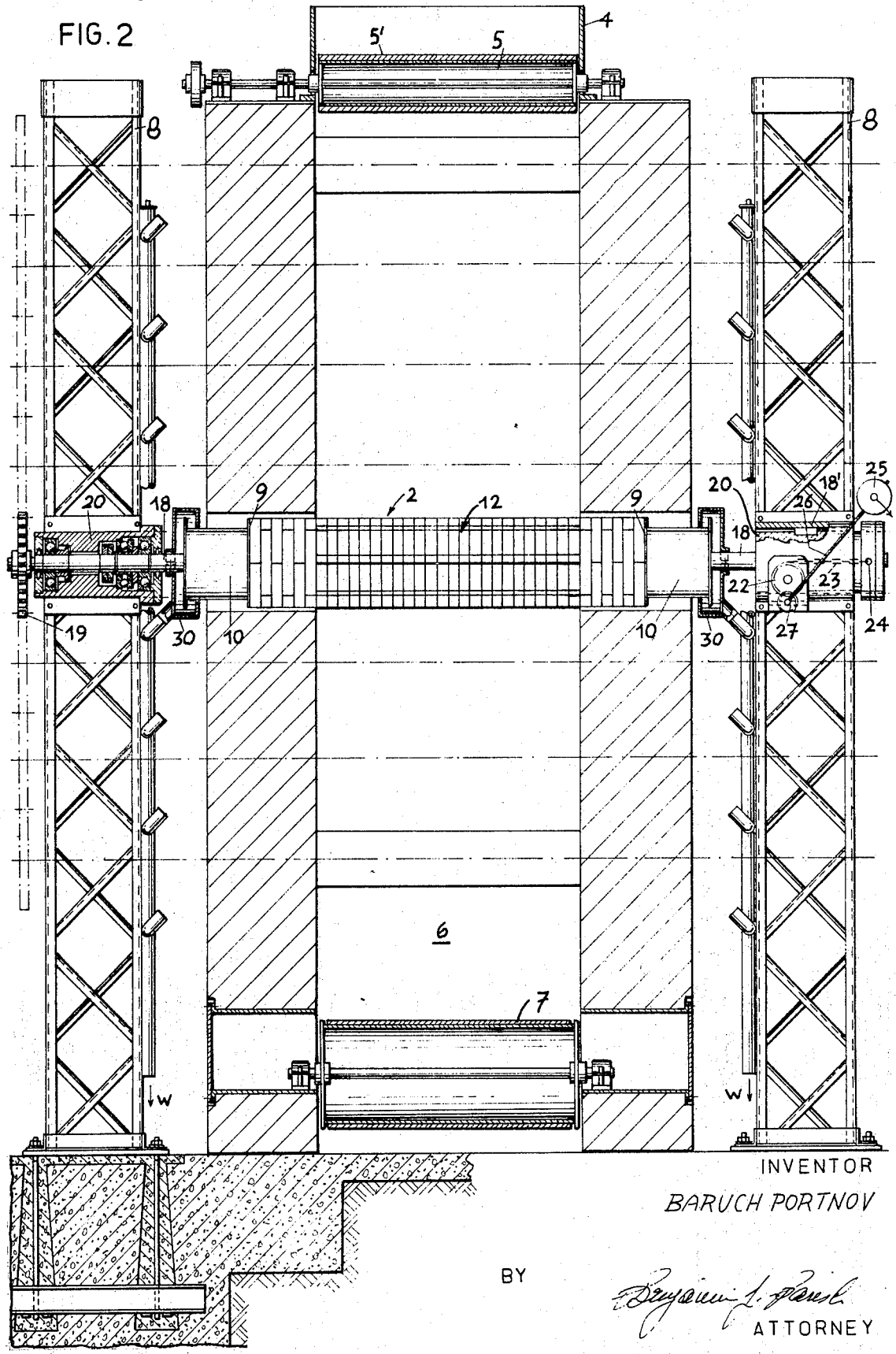

INVENTOR
BARUCH PORTNOV

BY
ATTORNEY

United States Patent Office 3,529,813
Patented Sept. 22, 1970

3,529,813
MATERIAL HEAT-TREATING APPARATUS WITH CONVEYOR
Baruch Portnov, 54 Hazorea St., Kfar Shmaryahu, Israel
Filed July 5, 1968, Ser. No. 742,725
Claims priority, application Israel, July 12, 1967, 28,302
Int. Cl. F27b *1/10*
U.S. Cl. 263—31     9 Claims

ABSTRACT OF THE DISCLOSURE

Material heat-treating apparatus comprises a heated chamber and a conveyor for conveying therethrough the material being heated, the conveyor comprising a plurality of rotary bodies each made up of a plurality of elements bearing one against the other all disposed within the chamber, the elements being held together by compressional forces exerted thereon by pressure members rotatably mounted on bearings disposed outside the chamber. The rotary bodies are vertically spaced and coupled to rotate together, the bearings and couplings for the rotary bodies, and the means for applying pressure to the pressure members to hold the elements together, also being disposed ouside the chamber.

BACKGROUND OF THE INVENTION

Field of the invention

The present invention relates to heat-treating apparatus for heating a material conveyed through the apparatus. One example of the invention is a kiln for heating or burning lime to produce burnt lime.

Description of the prior art

In heat-treating apparatus where the material to be heated is conveyed through a chamber heated to a very high temperature, for example up to 1500° C. or even higher, difficult problems arise in connection with the conveyor for moving the material through the apparatus, particularly with respect to the composition and structure of the conveyor bodies, their mounting, and their drive. These materials and structures have to be resistant not only to the high temperatures of the chamber, but also to the tendency to crack because of sharp changes in temperature frequently experienced. Heretofore these problems were solved, if at all, only by apparatus which was complicated in construction or costly to produce and maintain.

The present invention provides a novel heat-treating apparatus having advantages in the above respects.

SUMMARY OF THE PRESENT INVENTION

The present invention provides material heat-treating apparatus including a heated chamber and a conveyor for conveying through said chamber the material being heated, characterized in that the conveyor comprises a plurality of rotary bodies each made of a plurality of separate heat-resistant elements in contact with each other and disposed within the heated chamber, the rotary bodies being disposed in the heated chamber in vertically spaced relationship, bearings disposed outside the heated chamber and rotatably mounting the rotary bodies, and pressure means disposed outside the chamber for applying a sufficient axial compressional force to each of the rotary bodies so as to hold its separate heat-resistant elements together independent of an axle or other support.

According to a further important feature, there are provided couplings disposed outside the heated chamber mechanically coupling the rotary bodies to rotate together, the bearings, couplings and pressure means for all the rotary bodies being supported on vertical columns disposed outside and laterally of the heated chamber.

According to a still further feature, the pressure means includes a weight coupled to its respective rotary body so as to apply the axial compressional force thereto.

In accordance with a still further feature, the apparatus includes cooling means for the bearings which cooling means circulates a cooling fluid through paths completely disposed outside the heated chamber.

Such a construction has a number of advantages. Since the conveyor bodies are in the form of a plurality of separate elements, they may expand and contract upon sharp changes in temperature with less tendency to crack. Also, since the elements are held together by compressional forces alone, they do not require fasteners or other assembling devices which may be deleteriously affected by the heat or the sharp temperature changes. In addition, since the bearings, the pressure-applying means, and the drive, are all disposed outside the chamber they also are not affected by the high temperature or sharp temperature changes.

Additional features and advantages of the invention will be apparent from the description below.

BRIEF DESCRIPTION OF THE DRAWINGS

The invention is herein described, somewhat diagrammatically and by way of example only, with reference to the accompanying drawings, wherein:

FIG. 1 is an end view illustrating a heated kiln constructed in accordance with the invention;

FIG. 2 is a view of the kiln of FIG. 1 turned 90° C. but illustrating only one of the rotary conveyor bodies;

DESCRIPTION OF THE PREFERRED EMBODIMENT

Figure 4:
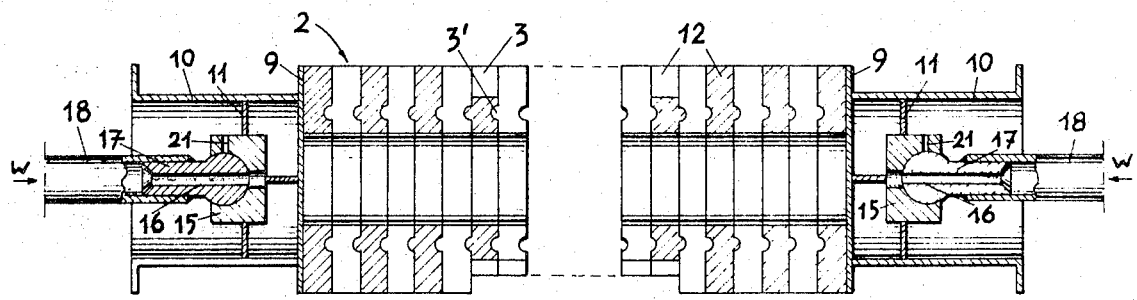
FIG. 4 is a sectional view along lines IV—IV of FIG. 3, but at both ends of the rotary conveyor body illustrated in FIG. 3.

The inner wall of the kiln illustrated in FIGS. 1 and 2 is made of fire-bricks defining the shaft or chamber 1 within which are disposed, in superposed, staggered relationship, a plurality of cylindrical conveyor bodies 2 provided with bucket-like recesses 3. The material to be heated, e.g. lime in pulverulent form, is introduced into the hopper 4 at the top of the kiln and passes over a rotary feed member 5 having a plurality of vanes 5' which continuously agitate the material to prevent clogging within the hopper.

The material falls by gravity onto the uppermost rotary conveyor body 2 and into its bucket-like recesses 3. Conveyor bodies 2 are positively rotated by a drive including meshing gears 19 and a motor (not shown), whereupon the material falls into the next lower conveyor body 2, and so on through the heated chamber until it drops onto an inclined plate 6 from which it passes by gravity onto a conveyor 7 and out of the kiln.

Figure 3:
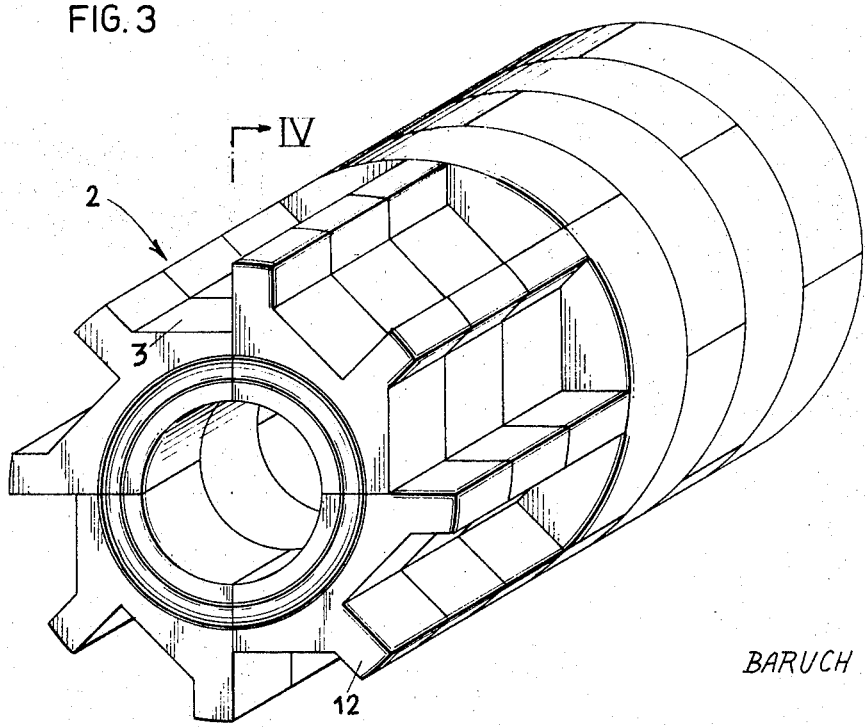
FIG. 3 is a partial perspective view illustrating the construction of one of the rotary conveyor bodies in FIG. 1.

Each of the rotary conveyor bodies 2 is made of a plurality of discs 12, the thickness of each disc being a fraction of its diameter. All the discs are arranged side-by-side and are held together by compressional forces. The discs are made of fire resistant material, such as fire-brick, and all the discs, except several of the end ones (6 end ones shown in FIGS. 2 and 4) are formed with cut-outs defining the above-mentioned recesses 3. One face of each disc is formed with an annular rib 3' (FIG. 4), and the other face is formed with a complementary annular groove to receive the rib of the adjacent disc. In addition, each disc is made of several sectors, e.g. quarters as shown in FIG. 3, the sectors being arranged in staggered relationship among adjacent discs as shown by the sectioning in FIG. 4.

Each of the rotary conveyor bodies 2 is mounted between a pair of structures 8, which may be lattice masts or other appropriate vertical columns, disposed outside the heated chamber 1 and laterally thereof. FIGS. 2 and 4 illustrate the mounting of one such rotary conveyor body 2. A pressure plate or disc 9 is provided at each of the two ends of the rotary conveyor body and bears against the end discs 12. These pressure plates 9 may be of metal, and to the outer face of each plate is welded a drum-like member 10 in which is fixed a spider 11 having the form, in axial section, of a cross. Spider 11 carries a block 15 forming a socket for the spherical end of a short cylinder 17 fixed at its opposite end in a hollow shaft 18. The outer end of each of the shafts 18 carries a bearing member 20 in which are mounted radial and thrust bearings (see the left bearing member 20 in FIG. 2). In addition, the bearing member 20 at the outer end of the right shaft 18 (FIG. 2) is rotatable in a sleeve 18' and is supported for sliding movement by a key, whereby the shafts 18, as well as the conveyor body 2 are permitted to rotate as well as to move axially within chamber 1. Both of the cylinders 17, including their spherical ends, are formed with through-going bores 16 communicating with the interior of the hollow shaft. The spherical end of cylinder 17 is rotatable in block 15, there being an oil hole 21 for lubricating this joint.

The outer end of the left shaft 18 (FIG. 2) carries a gear 19, the latter gears serving as couplings for mechanically coupling all the conveyor bodies 2 to rotate together.

The outer end of the right shaft 18 carries the pressure means for applying pressure to the plates 9. The latter means comprises a toothed wheel or sprocket 22 fixed to strutcure 8 near the outer end of the right shaft. A chain 23 is connected at one end to and meshes with sprocket 22, and is connected at its other end to the end plate 24 of bearing member 20. Sprocket 22 meshes with a second toothed wheel 27 to which is fixed a lever 26 carrying at its outer end a weight 25. The weight 25 thus exerts a pull, via wheels 27 and 22, on the chain, the latter applying a compressional force through bearing member 20 to shaft 18 and pressure plates 9 in an axial direction, sufficient to hold all the discs 12 together between the outer pressure plates independent of support by an axle or by attaching devices or other connections between the discs or plates. The amount of pressure can be varied by shifting weight 25 on lever 26.

The described embodiment of the invention also includes means for cooling shafts 18 and the attached parts disposed outside the heated chamber. For this purpose, shafts 18 are made hollow, and water is introduced at the outer ends, at W, and flows through bores 16 of shafts 18 into the drums 10. The water then drips into a collector 30 from which it can be drained. The path of the cooling fluid is thus completely disposed outside the heated chamber so that the heat in the chamber is not wasted.

The conveyor bodies 2, which are the only elements disposed within the heated chamber, may be made of highly heat-resistant material, such as fire-brick or ceramic. Those parts which have to be made of metal or of less heat-resistant material, i.e. the pressure plates 9, shafts 18 bearings 20, drive (wheel 19), cooling shafts 18, etc., are all located outside the heated chamber and can be kept cool as described. Further, since the conveyor bodies 2 are made of separate elements (i.e. separate discs 12, and the separate sectors making up each disc), the expansion and contraction of these elements arising from temperature fluctuations may be taken up with less tendency to crack. Axial expansion and contraction is permitted by the slidable mounting for shafts 18, while the axial pressure is always maintained by weight 25.

The elements making up the conveyor bodies 2 may be of different configurations than discs, and therefore the invention is not restricted to the discs shown by way of example. Many other variations, modifications, and applications of the described embodiment may be made.

What is claimed is:

1. Material heat-treating apparatus including a heated chamber and a conveyor for conveying through said chamber the material being heated, characterized in that said conveyor comprises a plurality of rotary bodies each made of a plurality of separate heat-resistant elements in contact with each other and disposed within said heated chamber, said rotary bodies being disposed in said heated chamber in vertically spaced relationship, bearings disposed outside said heated chamber rotatably mounting said rotary bodies, and pressure means disposed outside said chamber applying a sufficient axial compressional force to each of said rotary bodies so as to hold its separate heat-resistant elements together independent of an axle or other support.

2. Material heat-treating apparatus according to claim 1, further including couplings disposed outside said heated chamber mechanically coupling said rotary bodies to rotate together, said bearings, couplings and pressure means for all said rotary bodies being supported on vertical columns disposed outside and laterally of said heated chamber.

3. Material heat-treating apparatus according to claim 1, wherein said pressure means includes a weight coupled to each of said rotary bodies to apply said axial compressional force thereto.

4. Material heat-treating apparatus according to claim 1, further including cooling means for said bearings, said cooling means circulating a cooling fluid through paths which include said bearings but which paths are disposed completely outside said heated chamber.

5. Apparatus according to claim 1, wherein each of said rotary bodies is substantially cylindrical in shape and includes bucket-shaped recesses for receiving the heated material falling through the chamber by gravity.

6. Apparatus according to claim 1, further characterized in that said pressure means disposed outside said chamber comprises a lever fixed to a toothed wheel at one end and carrying a weight at the opposite end, a sprocket meshing with said toothed wheel, and a sprocket chain fixed at one end to and meshing with said sprocket, the other end of the chain being mechanically coupled to said rotary body elements to apply pressure thereto.

7. Apparatus according to claim 1, further characterized in that each rotary body is composed of a plurality of discs arranged side-by-side, the thickness of each disc being a fraction of its diameter, all said discs being held together by the compressional force applied by said pressure means.

8. Apparatus according to claim 7, further characterized in that each of said discs is composed of a plurality of sectors.

9. Apparatus according to claim 7, wherein said discs are each provided with an annular rib on one face and with a complementary groove on the opposite face receiving the annular rib of the adjacent disc.

References Cited

UNITED STATES PATENTS 849,465   4/1907   Dinges et al. _____ 263—31 X
1,018,951 2/1912   Adlof _____ 34—171

JOHN J. CAMBY, Primary Examiner

U.S. Cl. X.R.

34—173